US005245521A

United States Patent [19]

Spreen

[11] Patent Number: 5,245,521

[45] Date of Patent: Sep. 14, 1993

[54] SUPPRESSION OF TRANSFORMER CAPACITIVE CURRENT

[75] Inventor: James H. Spreen, Stone Ridge, N.Y.

[73] Assignee: International Business Machines Corporation, Armonk, N.Y.

[21] Appl. No.: 648,761

[22] Filed: Jan. 31, 1991

[51] Int. Cl.[5] ........................ H02M 5/45; G05F 1/33; H01F 15/14

[52] U.S. Cl. ........................................ 363/37; 363/53; 323/251; 336/69; 336/175

[58] Field of Search ...................... 363/17, 37, 68, 126, 363/53, 67, 136; 361/111; 323/251, 305, 328, 252; 336/69, 175

[56] References Cited

U.S. PATENT DOCUMENTS

| | | | |
|---|---|---|---|
| 2,244,386 | 6/1941 | Camilli | 171/119 |
| 2,340,098 | 12/1941 | Sühlke | 363/68 |
| 2,978,658 | 4/1961 | Reaves | 336/69 |
| 3,018,380 | 1/1962 | Bright et al. | 307/58 |
| 3,146,417 | 8/1964 | Pearson | 336/69 |
| 3,406,364 | 10/1968 | Russell et al. | 336/69 |
| 3,562,623 | 2/1971 | Farnsworth | 323/58 |
| 3,564,384 | 1/1971 | Adler | 321/2 |
| 3,665,288 | 5/1972 | Godawski | 321/24 |
| 3,886,434 | 5/1975 | Schreiner | 363/68 |
| 4,275,430 | 6/1981 | Seki | 363/57 |
| 4,307,334 | 12/1981 | Peil et al. | 323/351 |
| 4,311,977 | 1/1982 | Owen | 336/69 |
| 4,454,492 | 6/1984 | Thackray | 336/69 |
| 4,577,255 | 3/1985 | Martin | 361/119 |
| 4,689,730 | 8/1987 | Kimura | 363/21 |
| 4,800,344 | 1/1989 | Graham | 333/25 |

*Primary Examiner*—Steven L. Stephan
*Assistant Examiner*—Adolf Berhane
*Attorney, Agent, or Firm*—Michael J. Scheer; Robert L. Troike

[57] ABSTRACT

A method and apparatus for suppressing capacitive current in transformers is described. The winding of a transformer is constructed or modified into two substantially identical winding halves wired in a series aiding configuration. Two leads emanate from the center point of the winding, where the two halves are connected in series. This center point is at a constant potential throughout the switching cycle of the transformer. Suppression of the capacitive current in the input/output leads of the transformer is achieved by introducing common mode impedance into each lead and a corresponding center tap lead. The common mode impedance can be introduced in a variety of ways such as: running the pair of leads through a toroid, bead or sleeve of magnetic material; winding the leads on a magnetic toroid or rod; or using the magnetic core structure to introduce the impedance. Placement of any of these magnetic materials in substantial proximity to the lead pairs as arranged will suppress the capacitive current due to the coupling of the leads and the magnetic material.

30 Claims, 2 Drawing Sheets

SUPPRESSION OF TRANSFORMER CAPACITIVE CURRENT

FIELD OF THE INVENTION

This invention relates generally to switch mode power converters and more particularly to the suppression of parasitic capacitive currents in power transformers.

BACKGROUND OF THE INVENTION

Parasitic or stray capacitances occur in transformer design because of capacitive coupling of a winding to itself, to other windings, to internal shields or screens and to any mounting structure or hardware. These capacitances manifest themselves as unwanted current components in the leads of the transformer. The effect of these undesirable currents is to contribute to peak current stresses on the switch device and to generate unwanted electrical noise.

These deleterious manifestations become more pronounced as the switching frequency of power converters is increased. Two general reasons for this effect can be understood by an examination of the relationship between the voltage, v, and the current, i, in a lumped capacitor, C. In lumped capacitor terms, the relationship among these elements is given by the equation:

$$i = C \times dv/dt$$

First, as the switching frequency is increased, the time allowed for voltage transitions is decreased. Thus, an increase in the instantaneous time rate of change of the voltage, dv/dt will occur at various points in the circuit, including the primary winding connections. Examination of the above equation reveals that an increase in dv/dt will necessarily produce a corresponding increase in the capacitive current and thereby increase the generation of unwanted noise.

Secondly, if the switching frequency of the power transformer is to be increased, the transformer must be designed for lower leakage inductance. Structural arrangements such as interleaved windings which area typically used to reduce leakage inductance tend to increase the winding to winding capacitance, thus increasing the effective value of C. Again from the above equation, an increase in the value of C will produce a corresponding increase in current i, and thereby increases the generated noise.

The bulk of the prior art methods for suppressing unwanted capacitive effects can be categorized into three general groups: shielding; winding configuration; and external/internal filtering. The first group of transformers combat capacitance by shielding methods incorporated into the transformer design. The basic concept in shielding is to block the electric field between two conductors (e.g. winding-winding, primary-secondary, winding chassis) and thereby eliminate the capacitive coupling between the two members. Some of the shielding methods employed by the prior art have included shielding the entire transformer structure, the separate winding structures, layers of windings or individual windings themselves. The materials used for shielding has also varied greatly. Some examples of materials used are conductive paint, strips, sheets and meshes. One significant problem with shielding techniques is the cost of implementation. For example, if a layered approach for intrawinding shielding is attempted, the cost of manufacture is greatly increased in order to accommodate the application of the conductive layer between the winding layers. Other problems with shielding techniques include; injury to the transformer during the application of the shielding (breaking of wires in a winding layer); accessibility to the windings and/or the entire transformer after installation of the shielding; mechanical interference in the transformer; and in general, shielding against capacitive coupling reduces the desired magnetic coupling.

The second broad area of capacitive current suppression techniques involve a particular configuration of the windings of the transformer. The most straightforward approach in reducing capacitive current is by directly reducing the transformer capacitance (less capacitance, less capacitive current). Unfortunately, all of these capacitance reducing techniques tend to increase the leakage inductance of the transformer, which is generally undesirable. Some configuration techniques involve forming the individual windings using a particular geometric configuration in the layer to layer relationships thereby reducing the intrawinding capacitance. As with shielding though, the manufacturing cost of this approach as compared with the actual reduction in capacitive current may render this solution unattractive. Another method of reducing the capacitive currents is to maximize the spacing between the elements of the transformer (e.g. secondary to primary windings, secondary to core structure). The design trade-off with this approach is that as the spacing is increased, the desired magnetic coupling is decreased.

Intrawinding capacitance is also reduced in many transformers by merely splitting the winding into two halves wired in series. Transformer designers may split the winding for other reasons with reduced capacitance being a secondary configuration. One method employed with a split primary winding is to arranged the two halves so there is a minimal intrawinding voltage and therefore a minimal distributed capacitive current. A final configuration approach that has been used is to offset the primary and secondary (sometimes tertiary) windings in order to minimize the interwinding capacitance. Again, the design trade-off with this method is a corresponding reduction in the desired magnetic coupling.

The last general area of capacitive current reduction methods lies in the "filtering" of the associated noise component. One method of reducing this noise is by following the transformer with some form of external RC circuit (external to transformer itself). This same method has also been extended to incorporate an integral distributed resistance which taps into the windings of the transformer, thereby, in effect forming a series of transformers and associated RC circuits. The filtering methods to date all require some sort of circuitry, either external or internal, in order to suppress the capacitive current. These filtering methods have some sort of undesirable impact on the performance of the transformer such as frequency limitations or an increased loss in the windings.

OBJECTS OF THE INVENTION

It is therefore one object of this invention to improve capacitive current suppression in a transformer.

It is also an object of this invention to suppress peak currents, ringing and Electromagnetic Interference, EMI, caused by capacitive current in a transformer.

It is another object of this invention to effectively suppress capacitive current in a transformer without any transformer design or performance compromise such as increased leakage inductance.

It is an additional object of this invention to provide a capacitive current suppression system which can be inexpensively retrofited into existing switch mode power supplies.

It is another object of this invention to incorporate capacitive current suppression into the structure of the transformer core.

SUMMARY OF THE INVENTION

In any transformer design, there are certain capacitances which arise from the physical proximity of current carrying members to any other conductor in the transformer. These capacitances result in undesirable currents found in the input/output leads of the transformer which in turn result in peak current stresses, ringing and other deleterious EMI effects. In transformers which operate in a manner such that the center point of the primary winding is at nearly a constant potential, and which are arranged in a structurally symmetric fashion about this center point, the parasitic capacitance current flowing through this center point is negligible. Full bridge power converters use power transformers which operate in such a manner. By splitting the winding at this center point and wiring the two primary winding halves in series, (series aiding), access can be had to two leads emanating from the center point of the winding. These two center point leads carry only the reflected/transformed load current and the magnetization/excitation current of the transformer, but no capacitive current. Suppression of the capacitive current in the input/output leads is achieved by introducing common mode impedance into each primary lead and its corresponding center point lead. The common mode impedance can be introduced in a variety of ways such as: running the pair of leads through a toroid, bead or sleeve of magnetic material; winding the leads on a magnetic toroid or rod; or using the magnetic core structure to introduce the impedance. By placing any of these magnetic materials in substantial proximity to the lead pair, the electro-magnetic coupling of the leads (and the current travelling therethrough) to the material will produce the desired suppression.

It should be noted that unless otherwise indicated, the current arrows in the Figures of this description are intended to indicate the relative direction of current flow and not the relative magnitudes of the currents they represent. Furthermore, it should be noted that any magnetization current flowing in the windings has been neglected. The magnetization current generally flows in the same circuit paths as the load current reflected to the primary winding, and its presence has no effect on the noise and the load current flow paths described here. Therefore, for simplicity, this magnetization current has been omitted.

Further, for the sake of generality and brevity, the term "load current" in this description is used for both the load current which flows in the secondary or the output winding, and for the reflected or transformed load current component in the primary winding.

DESCRIPTION OF THE PREFERRED EMBODIMENT

Figure 1:
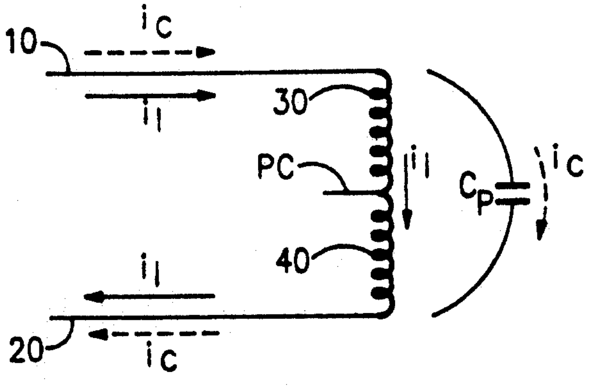
FIG. 1 depicts a lumped element model of intrawinding distributed transformer capacitance.
Figure 2:
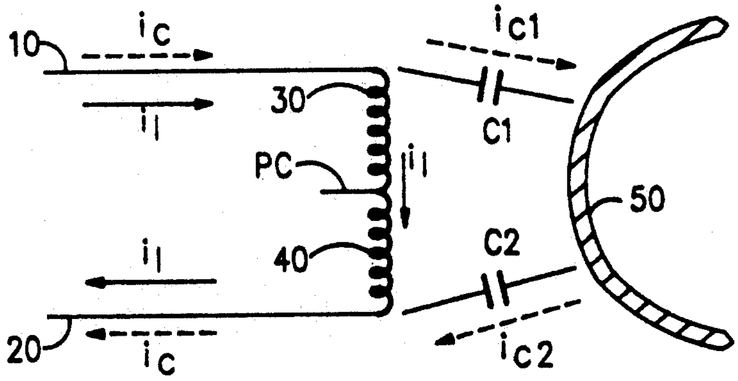
FIG. 2 shows a lumped element model of interwinding distributed transformer capacitance.

Understanding of the present invention can be best facilitated by a description of the physical situation which causes the stray or parasitic capacitive currents to arise. As previously stated, there are stray or parasitic capacitances in every transformer design. These capacitances can be explained by two basic models as shown in FIGS. 1 and 2. FIG. 1 is a lumped element model of the distributed intrawinding capacitance of a transformer. FIG. 2 illustrates the lumped element model for the interwinding or winding to structure distributed capacitance of a transformer.

As depicted in FIG. 1, the distributed intrawinding capacitance is the capacitance between a single turn and any other turn of the winding. This capacitance can also be termed a winding's self capacitance. FIG. 1 is called a lumped model because capacitor $c_p$ is representative of the sum of all of the distributed intrawinding capacitances which occur in the winding. The distributed intrawinding capacitances for the entire winding have been "lumped" together in element $c_p$ in FIG. 1 for ease of understanding, illustration and explanation. FIG. 1 is an accurate schematic from an electrical point of view since $c_p$ shunts the capacitive current, $i_c$, around the center point of the winding, PC. This shunting occurs because the winding arrangement is balanced around the center point PC, and by symmetry there is negligible net capacitive current flowing in the winding at PC.

As illustrated in FIG. 1, the leads of the transformer, 10 and 20, carry two current components, one being the load current, $i_l$, and the other being the capacitive current $i_c$. The load current, $i_l$ is shown being carried by the leads 10 and 20, through the two winding halves 30 and 40, and through the center point of the winding, PC. The capacitive current, $i_c$, is shown as being present in leads 10 and 20, but is shunted around PC through the capacitor $c_p$ as discussed previously. It must be noted that both of the currents $i_l$ and $i_c$ flow in a differential pattern in the leads 10 and 20. That is to say that the current in lead 10 is of the same magnitude, but opposite in direction, as compared to the current in lead 20. This differential relationship occurs if the capacitive current $i_c$ adds to the load current, as illustrated in the Figures, or opposes it, as might occur at other times in the switching cycle operation.

In addition to the intrawinding capacitances (self capacitance) as depicted in FIG. 1, there are also other stray capacitances which arise from the close physical proximity between a winding and other conductors in the transformer, such as between the primary and secondary windings (interwinding) or between the winding and the transformer core or chassis. FIG. 2 illustrates the lumped element model for the interwinding or winding to structure distributed capacitance of a transformer. Element 50 in FIG. 2 is representative of a low voltage secondary winding or any other grounded (or nearly grounded) structure in the transformer assembly. Capacitor c1 represents the capacitance between the winding half 30 and element 50. Similarly, capacitor c2 represents the capacitance between winding half 40 and element 50.

In a switch mode power converter, as contemplated by the present invention (full bridge, asymmetric half bridge (high voltage dual switch)), the potential at point PC in the power converter's transformer is approximately constant throughout the switching cycle. This means that the time rate of change of the potential difference between point PC and element 50 will be negligible and therefore there will be little if any interwinding capacitive current flowing through point PC. Conversely, there is a relatively large time rate of change of the potential difference between either of the winding halves and element 50. This dv/dt results in the capacitive currents $i_{c1}$ and $i_{c2}$ passing through the capacitances c1 and c2. FIG. 2 illustrates the above situation by shunting the two capacitive currents, $i_{c1}$ and $i_{c2}$, through capacitors c1 and c2, around point PC. As in the intrawinding model as shown in FIG. 1, the two transformer leads, 10 and 20, of the interwinding model of FIG. 2, carry two current components $i_l$ and $i_{c1}$ or $i_{c2}$. $I_l$ again represents the load current and $i_{c1}$ and $i_{c2}$ represent stray capacitive currents.

Both the two models described above provide an explanation for the existence of stray current components in the leads of a transformer. There are certain important aspects which are common to both models which need to be summarized. First, in either model, the leads of the transformer carry two current components, one being the load current, $i_l$, and the other being the capacitive current, $i_c$. Both of these currents flow in a differential pattern in the leads 10 and 20 (i.e., current $i_l$ in lead 10 flow in the opposite direction of $i_l$ in lead 20, the same being true for $i_c$ in leads 10 and 20). Second, only the load current $i_l$ passes through the center point, PC of the split winding. The capacitive current, $i_c$, is shunted around, and does not flow through the center point, PC.

Figure 3:
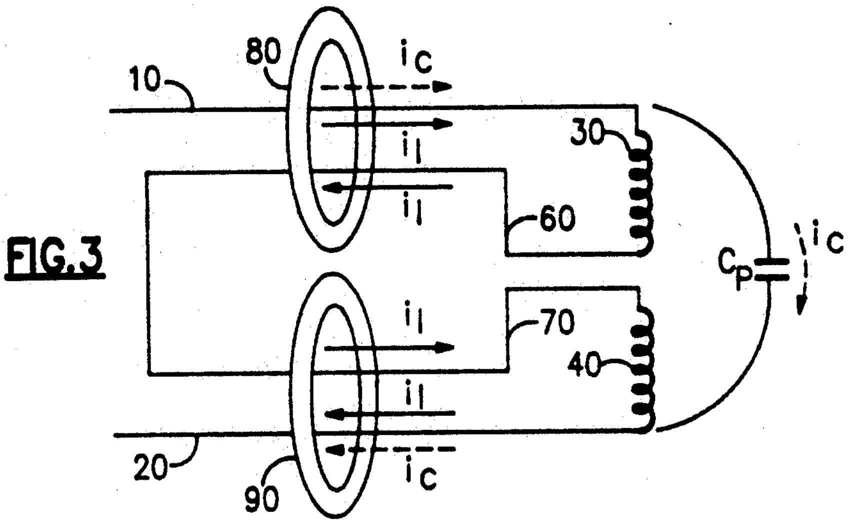
FIG. 3 is a schematic representation of the suppression of capacitive current in accordance with the present invention.

The present invention utilizes a unique combination of winding configuration and filtering techniques in order to suppress capacitive current. The winding configuration required for the present invention is one in which the the winding is split into two symmetrical balanced halves as shown in FIGS. 1, 2 and 3. As shown in FIG. 3, leads 10 and 20 are the two input leads to the transformer. Two additional leads, 60 and 70, are brought out from the two winding halves 30 and 40 respectively. Leads 60 and 70 in FIG. 3 emanate from the same point PC as shown in FIGS. 1 and 2. These leads, 60 and 70, are electrically connected, thereby connecting the two windings halves in series. The series connection described is commonly referred to as being series aiding as compared to a series opposing connection. These four leads will be considered in pairs, leads 10 and 60 forming one pair, and leads 20 and 70 forming a second pair. In this discussion, if reference is made to one of the lead pairs, the same discussion is applicable to the other lead pair because of the symmetry between the two pairs. Similarly, if reference is made to a primary winding, the same discussion is applicable any other winding of the transformer such as the secondary or tertiary windings.

As previously described, and further depicted in FIG. 3, transformer leads 10 and 20 carry both the load current, $i_l$, and the capacitive current, $i_c$, while leads 60 and 70 carry only the load current. It can be seen in FIG. 3 that in both the lead pairs 10–60 and 20–70, the transformed load current, $i_l$, is a strictly differential mode current. Again, differential currents are those which flow such that the currents in pair of conductors are of the equal magnitude, but travel in an opposite direction in each of the conductors. In the present case, $i_l$ is of equal amplitude in each lead of pair 10–60, flowing in one direction in lead 10 but in the opposite direction in lead 60. The same is true of $i_l$ in lead pair 20–70. In comparison to the differential current $i_l$, the capacitive current, $i_c$, is not differential since it flows only in leads 10 and 20. There is no capacitive current flowing in leads 60 and 70.

Because of the unique current arrangement in the lead pairs, if common mode impedance is introduced into a pair, the capacitive current, $i_c$, will be suppressed, but there will be no effect on the differential mode current $i_l$. The basic method of introducing common mode impedance is to place a structure constructed of a magnetic material in substantial proximity to the leads carrying the common mode current. Because of the electro-magnetic coupling to the magnetic material, the common mode currents will be suppressed. The degree of proximity of the material to the leads will depend on a number of factors such as physical limitations in the transformer design (e.g., how much physical space is available) and the degree of suppression desired. For example, if not as much suppression of the capacitive current is required, the coupling to the magnetic material will not have to be as tight, and the material will not have to be placed in such close proximity to the current carrying leads.

One method of introducing this common mode impedance is to pass the pair of leads through a toroid constructed of the magnetic material. This particular embodiment is shown in FIG. 3, where elements 80 and 90 represent magnetic toroids. Because of the proximity of the magnetic toroid to the current carrying leads, a magnetic flux will be induced in the toroid. There will be no effect to the differential current $i_l$ because the magnetic flux induced in the toroid 80 by current $i_l$ in lead 10 will be cancelled out by the equal and opposite flux induced by the equal and opposite current, $i_l$, in lead 60. With the two fluxes generated by the current $i_l$ cancelling out, the net impedance to the current $i_l$ in both leads is zero. Conversely, because the capacitive current $i_c$ flows in only one of the leads, 10, there is no equal and opposite flux in the toroid to oppose the flux induced by $i_c$. The flux induced in the toroid by $i_c$ in lead 10 will act to impede the undesirable capacitive current, $i_c$ and thereby suppress it.

Figure 4:
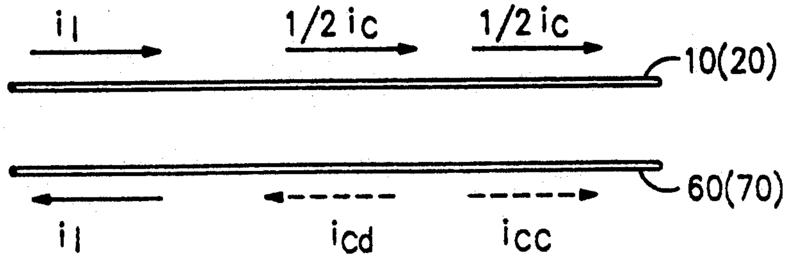
FIG. 4 is a detailed depiction of FIG. 3 showing the suppression of capacitive current.

Another way of conceptualizing the suppression of the capacitive current is depicted in FIG. 4. In this figure, the upper conductor is either lead 10 or 20 and is represented as carrying both the load current, $i_l$, and the capacitive current, $i_c$. The current $i_c$ in the top conductor is illustrated as being composed of two currents $\frac{1}{2}$ $i_c$ and $\frac{1}{2}$ $i_c$, the sum of which is $i_c$. The lower conductor, either lead 60 and 70, is shown carrying the load current, $i_l$, and two other theoretical current components, $i_{cd}$ and $i_{cc}$. The magnitude of each of these two other currents is equal to $\frac{1}{2}$ $i_c$. Current $i_{cd}$ flows in the same direction as $i_l$ and current $i_{cc}$ flows in the opposite direction. The net of these two theoretical currents in the conductor being zero. When common mode impedance is introduced into the pair of conductors, there will be no effect on the purely differential current $i_1$. Similarly, one of the $\frac{1}{2}$ $i_c$ currents in leads 10 or 20 and current $i_{cd}$ will not be affected by the common mode impedance because they are differential mode (i.e., they are equal in magnitude and flow in opposite direction). In contrast, the other $\frac{1}{2}$ $i_c$ component in leads 10 or 20 flows in the same direction as the theoretical current $i_{cc}$. Because these two currents are common mode (i.e., they flow in the same direction and they are the same magnitude), the common mode impedance introduced by the toroid will reduce these two currents.

In the above analysis of the capacitive current suppression it will be noted that the common mode impedance will not have any effect on $\frac{1}{2}$ of the capacitive current $i_c$ in leads 10 and 20. This is one reason why the term suppression is used instead of elimination. The present invention will not completely eliminate but will significantly suppresses the capacitive current. In actual testing of the invention though, the results achieved are far superior than the prediction of our simple theoretical model. Much greater suppression was observed than the $\frac{1}{2}$ $i_c$ shown in the above theoretical example. The increased suppression was due to the fact that the elements in the real world are not ideal and do not act as precisely as depicted in our ideal models. These results further indicate that the effectiveness of the approach is not significantly degraded if the ideal conditions assumed for analysis are not met (e.g. perfect symmetry and an exactly positioned center point).

As alternatives to using the magnetic toroid in the manner described above, there are several other ways in which to introduce the common mode impedance. In general, one can surround the lead pair with any magnetic material structure which will introduce the desired impedance. For example, a magnetic bead or sleeve can be used instead of a toroid. The lead pair is passed though the bead or sleeve similar to manner described above with respect to a toroid. The lead pair can also be wound on a toroid instead of being passed through the toroid. This winding of the leads on the toroid will introduce the common mode impedance in a similar manner as passing the leads through the toroid and thereby suppressing the capacitive current. Similarly, the leads can be wound on a magnetic rod instead of a toroid and thus introduce the same common mode impedance. The choice of which approach to take is dependent on the degree of noise reduction required and other factors such as cost, fabrication, ruggedness, etc.. For example, if only one design of toroid is available, several toroids can be placed on the leads, thus increasing the amount of magnetic material and in turn increasing the impedance provided. Similarly, the number of turns that are wound on a toroid or rod would increase the impedance.

One distinct advantage of the suppression technique described thus far is the ability to adapt the method to existing transformers. Any transformer which is of a split winding design and whose leads are accessible can be retrofitted by using the design of the present invention. The invention is especially useful when a transformer, which has already been placed in its application, is found to require further noise reduction. Instead of replacing the transformer, or attempting other costly shielding or filtering techniques, the above suppression design can be easily implemented at a low cost. Even if the transformer is not of a split winding design, if the windings are accessible, then they can be split into two substantially symmetrical halves and the above common mode impedance techniques can be used to suppress the capacitive current. If the windings of a transformer in a switch mode power supply are not accessible, then the parasitic current can still be suppressed by replacing the existing transformer with one of the present design. Although this alternative is less attractive, it is far more desirable then replacing the entire switch mode power supply.

Figure 6:
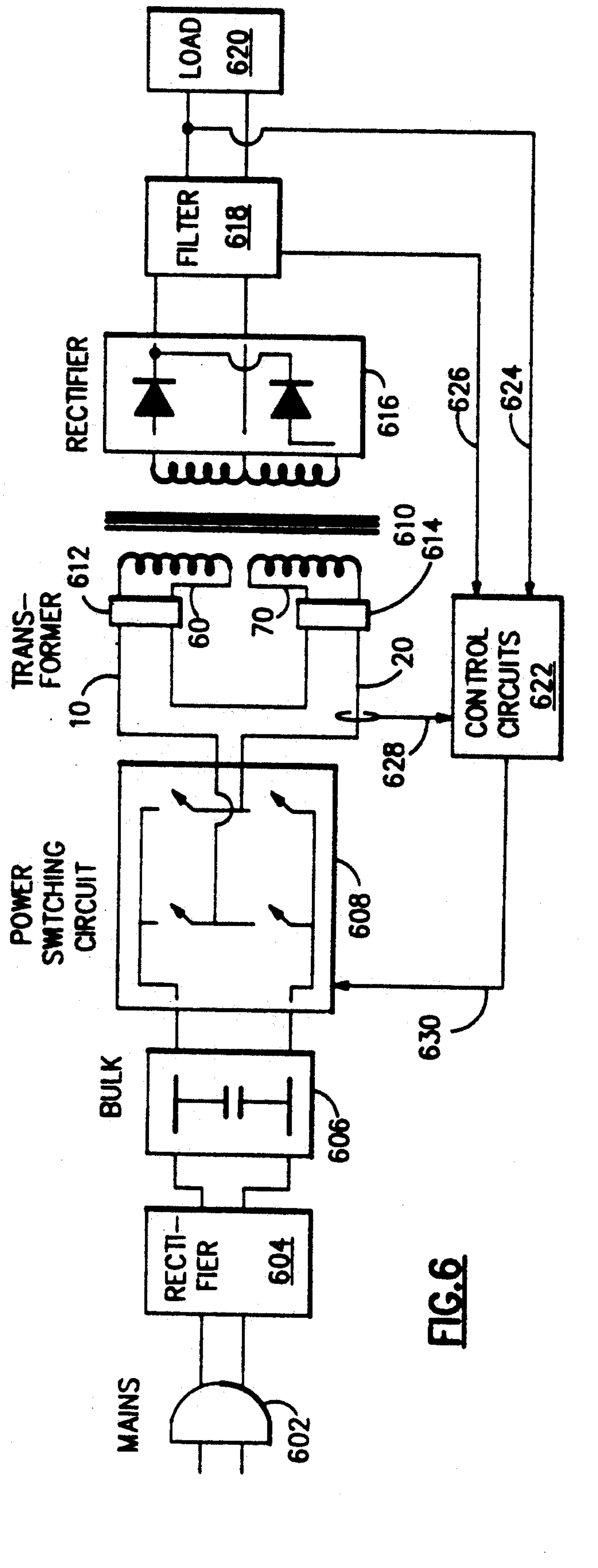
FIG. 6 is a block diagram of a power supply incorporating a transformer with capacitive current suppression according to present invention.

FIG. 6 is a block diagram of a power supply incorporating a transformer with capacitive current suppression according to the present invention. The connection to some utility power main, which may be, for example, 50 to 60 Hertz, single or three phase, 120 to 240 volts alternating current (ac), is represented in FIG. 6 by the stylized plug 602. This ac power is rectified by an appropriate rectifier arrangement 604. The resulting unregulated direct current (dc) power may be filtered and stored in a "bulk" capacitor 606, with a bulk voltage in the range of 150 to 400 volts dc. This unregulated voltage is then fed to additional circuitry which functions as a dc-dc converter with regulation.

The first step in the dc-dc conversion is the generation of high frequency power by the power switching circuit 608. For converters in which the parasitic capacitive currents and reflected load currents have the relationship described in detail elsewhere in this application, the power switching circuits produce a symmetric drive to the transformer. Examples of such circuits are a half bridge with capacitors and a full bridge, suggested by the diagram in 608 in FIG. 6. The switching devices may be, for example, bipolar transistors or power field effect transistors. The switching times of the devices are determined by appropriate signals 630 from the control circuits 622, in order to achieve regulation of the voltage at the load 620. The fundamental switch frequency of the devices may be in range of 20 Kilohertz to 1 Megahertz. In each application, the specific operating value or range of values is determined by engineering judgment, balancing various competing aspects well known in the art.

The symmetric, high frequency ac voltage is applied to the primary winding leads 10, 20, of the power transformer 610. According to the present invention, additional primary leads 60, 70 are arranged so that a common mode impedance 612 appears in the lead pair 10, 60, and a second common mode impedance 614 appears in the lead pair 20, 70, to suppress unwanted current flow in the parasitic capacitances in the transformer. The transformer turns ratio is selected to provide the desired load voltage, using relationships well known in the art.

The ac voltage on the transformer secondary is rectified by some rectifier arrangement 616. This arrangement may be, for example, a full wave bridge circuit or a center tapped full wave rectifier, as suggested by the diagram inside 616 in FIG. 6. The rectifier output is filtered by some appropriate filter 618 designed with approaches well known in the art, to provide filtered and regulated dc voltage to the load 620.

The control circuits 622 are part of a closed loop control system which provides regulation of the output voltage to a predetermined value, in spite of variations of such quantities as the bulk voltage, load current, and device characteristics. The control circuits adjust the switch timing of the switch devices in the power switching circuit 608 to maintain this desired load voltage. This adjustment is performed using the sensed value of the output voltage, as indicated by the sense line 624 in FIG. 6. More sophisticated controls, well known in the art, many sense some variables in the output filter, shown by sense line 626, and may sense the primary winding current, shown by sense line 628. In a converter in which the closed loop control system senses the primary winding current, a transformer according to the present invention may improve the quality of the signal 628 sensed by the control circuits 622 by suppressing the parasitic capacitive current which makes an undesired contribution to the sensed signal.

Figure 5:
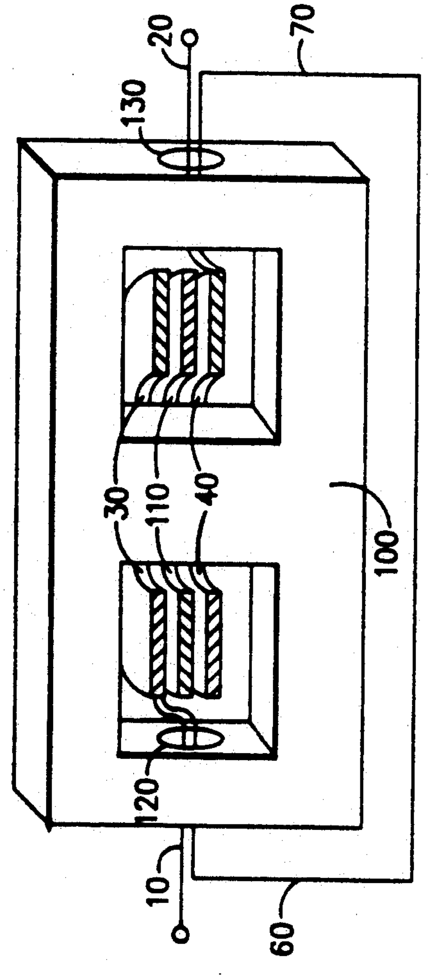
FIG. 5 shows a transformer whose core design incorporates the suppression techniques of the present invention.

A final embodiment of the present invention is shown in FIG. 5. As is seen in this figure, the transformer core itself, 100, is used to provide the common mode impedance to the lead pairs. This embodiment is desirable when the initial design of a transformer is contemplated as opposed to a retrofit application as previously described. Elements 30 and 40 in FIG. 5 represent a cross-sectional view of the two halves of the primary winding which are wound around the center leg of the transformer core 100. Element 110 is a cross-sectional view of the secondary winding of the transformer which is similarly wound on the center leg of the core 100. The routing of the leads of the secondary winding, 110, has not been depicted since the configuration of the secondary winding remains unaltered by this design.

In this embodiment of the invention, lead pair 10–60 is brought out from the first primary winding half, 30, through aperture 120 in the transformer core, 100. Similarly, lead pair 20–70 from winding half 40 passes through the transformer core, 100, via aperture 130. The two winding halves are connected in a series aiding configuration by electrically connecting leads 60 and 70. By passing the lead pairs through the transformer core, we have surrounded the current carrying pair with magnetic material. This material will introduce the desired common mode impedance and thereby suppress the parasitic capacitive current.

During the manufacturing phase of a transformer, this design can be implemented in any number of ways such as having the apertures 120 and 130 formed by grooves in the mating faces of the E-E cores. During the assembly of the transformer, the lead pairs can be positioned in the grooves before mating, thereby obviating any need for drilling or threading operations. This method allows for ease of manufacturing since no additional mounting hardware is required to hold the toroids or other magnetic material. Alternatively, the apertures for the lead pairs can be drilled in existing E-E core transformers and the leads configured as described above.

While particular embodiments of the present invention have been shown and described, it will be understood by those skilled in the art that modifications may be made to a particular embodiment without departing from the true spirit and scope of the present invention.

I claim:

1. A capacitive current suppression system comprising:

a transformer having at least one winding being divided into substantially identical first and second portions, said first and second winding portions being electrically connected in series;

said transformer having two pairs of leads, a first pair of leads being electrically connected to said first winding portion and a second pair of leads being electrically connected to said second winding portion;

at least one magnetic coupling means for providing common mode impedance to common mode currents in at least one of said pairs of leads, said magnetic coupling means further allowing unimpeded current flow for differential mode currents in said pair of leads.

2. A system in accordance with claim 1 wherein said magnetic coupling means is comprised of a magnetic material.

3. A system in accordance with claim 2 wherein said magnetic material encircles said pair of leads.

4. A system in accordance with claim 3 wherein said magnetic material is toroidal in shape.

5. A system in accordance with claim 3 wherein said magnetic material is in the shape of a bead.

6. A system in accordance with claim 3 wherein said magnetic material is in the shape of a sleeve.

7. A system in accordance with claim 1 wherein said leads of said pair of leads are wound on said magnetic coupling means.

8. A system in accordance with claim 7 wherein said magnetic coupling means is toroidal in shape.

9. A system in accordance with claim 7 wherein said magnetic coupling means is in the shape of a rod.

10. An apparatus in accordance with claim 1 wherein a first magnetic coupling means provides common mode impedance to said first pair of leads and a second magnetic coupling means provides common mode impedance to said second pair of leads.

11. A system for suppressing capacitive current comprising:

a transformer;

at least one winding of said transformer being divided into two substantially identical first and second portions;

said first winding portion having a first lead and a second lead, said first and second leads forming a first lead pair;

said second winding portion having a third lead and a fourth lead, said third and fourth leads forming a second lead pair;

said second lead and said third lead being electrically connected whereby said first and second winding portions are connected in series;

a magnetic material in substantial proximity to at least one of said lead pairs, said material providing common mode impedance to said lead pair, whereby said capacitive current in said lead pair is suppressed.

12. A system in accordance with claim 11 wherein said magnetic material encircles said lead pair.

13. A system in accordance with claim 11 wherein said lead pair is wound on said magnetic material.

14. A system for suppressing capacitive current in a transformer comprising:

said transformer having a core of magnetic material;

at least one winding of said transformer being divided into two substantially identical first and second portions;

said first winding portions having first lead pair;

said second winding portion having second lead pair;

said first and second winding portions being electrically connected in series;

said core having at least a first aperture extending therethrough;

at least one of said lead pairs extending through said first aperture in said core, said core providing common mode impedance to common mode currents in said lead pair, said core further allowing unimpeded current flow for differential currents in said lead pair.

15. An apparatus in accordance with claim 14 wherein said first lead pair extends though said first aperture in said core and said second lead pair extends through a second aperture, in said core, said core providing said common mode impedance to both said first and second lead pairs.

16. A method for suppressing capacitive current in a transformer comprising the steps of:

dividing at least one winding of said transformer into two substantially identical portions;

connecting a first lead pair to said first winding portion;

connecting a second lead pair to said second winding portion;

connecting said first winding portion series aided with said second winding portion;

positioning a magnetic material in substantial proximity to at least one of said lead pairs whereby said material provides common mode impedance to said lead pair and thereby suppressing capacitive current in said lead pair.

17. A method in accordance with claim 16 further comprising the step of:

encircling said lead pair with said material.

18. A method in accordance with claim 16 further comprising the step of:

winding said lead pair around said magnetic material.

19. A power supply with reduced capacitive current comprising:

a first conversion means for converting low frequency alternating current into high frequency alternating current;

a transformer having as an input said high frequency alternating current, said transformer providing transformed high frequency alternating current as an output;

said transformer having at least one winding being divided into substantially identical first and second portions, said first and second winding portions being connected in series;

each of said winding portions having a pair of leads connected thereto;

at least one magnetic coupling means for providing common mode impedance to common mode currents in at least one of said pair of leads, and for allowing unimpeded current flow for differential currents in said pair of leads; and a second conversion means connected to said transformer output for converting said transformed high frequency alternating current into direct current.

20. A power supply in accordance with claim 19 further comprising;

a control means connected to said first and second conversion means for providing regulation of said direct current.

21. A power supply in accordance with claim 19 wherein said first conversion means further comprises;

a first rectifying means connected to an alternating current power main for supplying rectified direct current;

a bulk storage means for storing said rectified direct current;

a switching means connected to said bulk storage means, said switching means supplying said high frequency alternating current to said transformer.

22. A power supply in accordance with claim 19 wherein said second conversion means further comprises;

a second rectifying means connected to said transformer output;

a means following said second rectifying means for filtering said direct current.

23. A power supply in accordance with claim 19 wherein said magnetic coupling means is comprised of a magnetic material.

24. A power supply in accordance with claim 23 wherein said magnetic material encircles said pair of leads.

25. A power supply in accordance with claim 24 wherein said magnetic material is toroidal in shape.

26. A power supply in accordance with claim 24 wherein said magnetic material is in the shape of a bead.

27. A power supply in accordance with claim 24 wherein said magnetic material is in the shape of a sleeve.

28. A power supply in accordance with claim 19 wherein said leads of said pair of leads are wound on said magnetic coupling means.

29. A power supply in accordance with claim 28 wherein said magnetic coupling means is toroidal in shape.

30. A power supply in accordance with claim 28 wherein said magnetic coupling means is in the shape of a rod.

* * * * *